US011269679B2

(12) United States Patent
Raman et al.

(10) Patent No.: US 11,269,679 B2
(45) Date of Patent: Mar. 8, 2022

(54) RESOURCE-GOVERNED PROTOCOL AND RUNTIME FOR DISTRIBUTED DATABASES WITH CONSISTENCY MODELS

(71) Applicant: Microsoft Technology Licensing, LLC, Redmond, WA (US)

(72) Inventors: Karthik Raman, Sammamish, WA (US); Arsalan Ahmad, Redmond, WA (US); Momin Mahmoud Al-Ghosien, Sammamish, WA (US); Padma Priya Aradhyula Bhavani, Bellevue, WA (US); Rajeev Sudhakar Bhopi, Mercer Island, WA (US); Junyan Guo, Seattle, WA (US); Ji Huang, Bothell, WA (US); Atul Katiyar, Sammamish, WA (US); Hemant Kumar, Bellevue, WA (US); Sujit Vattathil Kuruvilla, Redmond, WA (US); Ovidiu Constantin Platon, Redmond, WA (US); Venkata Sivaramakrishna Ramadugu, Bellevue, WA (US); Ankur Savailal Shah, Redmond, WA (US); Pankaj Sharma, Kirkland, WA (US); Dharma Shukla, Bellevue, WA (US); Shreshth Singhal, Seattle, WA (US); Shireesh Kumar Thota, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 318 days.

(21) Appl. No.: 15/971,324

(22) Filed: May 4, 2018

(65) Prior Publication Data

US 2019/0340011 A1 Nov. 7, 2019

(51) Int. Cl.
*G06F 9/46* (2006.01)
*G06F 3/06* (2006.01)
(Continued)

(52) U.S. Cl.
CPC .............. *G06F 9/466* (2013.01); *G06F 3/065* (2013.01); *G06F 3/0619* (2013.01);
(Continued)

(58) Field of Classification Search
CPC ...... G06F 9/466; G06F 16/27; G06F 16/2365; G06F 3/0619; G06F 3/065; G06F 11/3006
See application file for complete search history.

(56) References Cited

U.S. PATENT DOCUMENTS 7,185,236 B1 2/2007 Moser et al.
7,433,928 B1 * 10/2008 Ranade ................. H04L 67/104
709/213

(Continued)

*Primary Examiner* — Doon Y Chow
*Assistant Examiner* — Phuong N Hoang
(74) *Attorney, Agent, or Firm* — Alleman Hall Creasman & Tuttle LLP

(57) ABSTRACT

Distributed transactions are performed over a collection of servers operating as replicas of a data set, where a successful transaction involves meeting a quorum count of replicas that locally commit the transaction. However, performance constraints of data sets and consuming applications may vary (e.g., sensitivity to latency, scalability, and/or consistency), and the performance characteristics of the server set may be partly determined by the transactional commitment and quorum selection. The distributed transaction may be applied by designating the replicas as a set of followers and a leader that initiates the transaction and receives acknowledgments of local commits by each follower. On condition of the acknowledgments meeting a quorum count for the data set according to the performance characteristics of the application, the leader locally commits the transaction and delivers a result. The transaction may also be applied over collections of replica sets using a second-level quorum to achieve nested consensus.

20 Claims, 8 Drawing Sheets

(51) Int. Cl.
  *G06F 11/30* (2006.01)
  *G06F 16/27* (2019.01)
  *G06F 16/23* (2019.01)
(52) U.S. Cl.
  CPC ...... *G06F 11/3006* (2013.01); *G06F 16/2365* (2019.01); *G06F 16/27* (2019.01)

(56) References Cited

U.S. PATENT DOCUMENTS

| | | | |
|---|---|---|---|
| 7,451,221 B2 | 11/2008 | Basani et al. | |
| 7,624,155 B1 | 11/2009 | Nordin et al. | |
| 8,423,507 B2 | 4/2013 | Yamada | |
| 8,838,539 B1* | 9/2014 | Ashcraft | H04L 67/02 |
| | | | 707/637 |
| 9,047,331 B2* | 6/2015 | Rao | G06F 16/27 |
| 9,465,650 B2 | 10/2016 | Meng et al. | |
| 9,569,513 B1* | 2/2017 | Vig | G06F 16/2471 |
| 9,690,679 B2* | 6/2017 | Shah | G06F 11/1474 |
| 10,366,106 B2* | 7/2019 | Fan | H04L 67/1002 |
| 2003/0014432 A1 | 1/2003 | Teloh et al. | |
| 2005/0283644 A1* | 12/2005 | Lorch | G06F 11/187 |
| | | | 714/4.4 |
| 2006/0090095 A1* | 4/2006 | Massa | G06F 11/182 |
| | | | 714/4.11 |
| 2007/0156842 A1* | 7/2007 | Vermeulen | H04L 67/1097 |
| | | | 709/217 |
| 2008/0270531 A1 | 10/2008 | Revanuru | |
| 2012/0239722 A1* | 9/2012 | Bolosky | G06F 16/275 |
| | | | 709/201 |
| 2012/0254342 A1* | 10/2012 | Evans | H04L 67/1097 |
| | | | 709/214 |
| 2013/0110781 A1* | 5/2013 | Golab | G06F 16/275 |
| | | | 707/638 |
| 2013/0232115 A1* | 9/2013 | Voutilainen | G06F 9/5061 |
| | | | 707/638 |
| 2014/0095813 A1* | 4/2014 | Shukla | G06F 3/0673 |
| | | | 711/154 |
| 2014/0143205 A1* | 5/2014 | Leshchiner | G06F 16/27 |
| 2016/0132581 A1* | 5/2016 | Hsieh | G06F 16/2343 |
| | | | 707/615 |
| 2017/0177277 A1* | 6/2017 | Laden | G06F 3/067 |
| 2018/0314706 A1* | 11/2018 | Sirton | G06F 16/1837 |

* cited by examiner

| CONSISTENCY MODEL | TRANSACTION TYPE | |
|---|---|---|
| | READ TRANSACTION | WRITE TRANSACTION |
| STRICT CONSISTENCY | MAJORITY QUORUM | MAJORITY QUORUM |
| BOUNDED STALENESS CONSISTENCY | MINORITY QUORUM (ACKNOWLEDGMENTS TIME-BOUND) | MAJORITY QUORUM |
| SESSION CONSISTENCY | SINGLE-REPLICA QUORUM (REPLICA WITH MINIMUM LSN) | MAJORITY QUORUM |
| EVENTUAL CONSISTENCY | SINGLE-REPLICA QUORUM | MAJORITY QUORUM |

FIG. 7

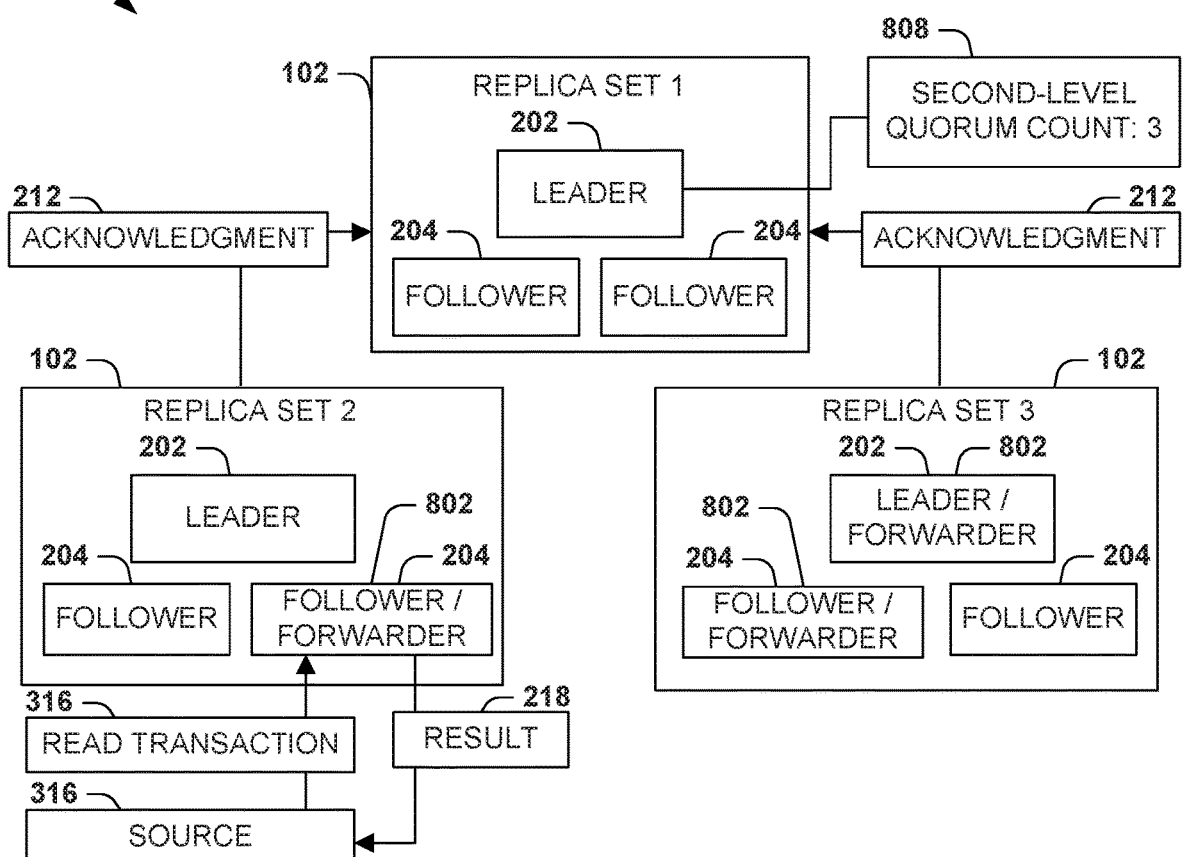

FIG. 8

RESOURCE-GOVERNED PROTOCOL AND RUNTIME FOR DISTRIBUTED DATABASES WITH CONSISTENCY MODELS

BACKGROUND

Within the field of computing, many scenarios involve a distributed data set over which transactions are applied by a set of servers, such as a distributed database in which various servers read and write database records. In some scenarios, the servers are configured as replicas of the replica set, and updates to the data set may occur at any replica, which may propagate the updates with the other replicas based upon a synchronization schedule. However, the data set may also be expected to be consistent in various ways, such that reads performed at different replicas are expected to provide the same result, and/or that a write performed at one replica is reflected by a subsequent read at another replica. The consistency model of the data set may vary based on the data and applications thereof. For example, some data sets may utilize a strict consistency model with an idealized property of complete consistency of all accesses, while other data sets may be suitable for an eventual consistency model, in which a write at a first replica is not expected to be instantaneously apparent at a second replica, but where the second replica eventually reaches consistency.

In view of the available consistency models and consistency needs of the data set, a replica set may permit transactional operations over the data set, in which an operation is to be performed in synchrony by the replicas of the replica set. For example, a write transaction may involve a request to write a value or a set of values to the data set, and it may be desirable to perform the transaction such that either the write is successfully applied to the data set by all of the replicas, or the write cannot be applied by all of the replicas and is therefore apply by none of the replicas. A read transaction may involve a request to read and verify a value of a selected unit of data by the replicas, such that either the replicas unanimously agree on the value of the data or the replicas identify and automatically resolve a disagreement as to the value (e.g., by reaching unanimous agreement about the value of the data unit once all replicas reach a state of consistency). Other transactions may involve a combination of read and write operations that are applied by the replica set according to a particular logic.

A transaction may be applied over a distributed data set by first initiating a request to each replica to attempt the transaction. The result of the transaction may be based upon reaching a quorum among the replicas, where a transaction succeeds if it is completed by a threshold number of replicas (e.g., a specified number of the replicas successfully write the value of a data unit, or a specified number of the replicas agree on a read value of a data unit). Upon reaching a quorum, the replica set may commit the transaction (e.g., making the write value permanent or providing the read value as the definitive answer for the read transaction); upon failing to reach a quorum, the replica set may reverse any provisional writes in order to restore the data unit to its value prior to the transaction, and/or the replica set may respond that it is currently unable to agree on the value of a data unit. If unsuccessful, the distributed transaction may be attempted again at a later time, at which point the replicas have reached consistency. The use of a quorum agreement as to the condition of success may be more realistic than an expectation of unanimity among a distributed set of replicas.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The implementation of quorum-based transactions may encounter difficulties when scaled to the level of a distributed data set, particularly a data set that is distributed over a large number of replicas and/or over a large geographic region, in which data values may fluctuate rapidly and/or in inconsistent ways, and in which consistency may be difficult to achieve. As a first example, a potentially large and/or dynamic server set may exhibit fluctuation, and the replica set may have difficulty agreeing on the quorum size for a distributed transaction in view of the addition, removal, failure, corruption, and/or temporary or persistent inaccessibility of one or more of the replicas. In some circumstances, a distributed quorum protocol may lead the replica set may reach a misunderstanding as to the quorum size for a transaction, which may lead to potential scenarios in which some replicas operate as if quorum has been reached (and therefore locally commit the transaction) while other replicas operate as if quorum has not been reached (and therefore rollback the transaction), resulting in a potentially unresolvable inconsistency.

As a second such example, different data sets may exhibit different sensitivities and/or tolerances for various performance characteristics, such as different levels of concurrency. For example, a quorum-based transactional technique that satisfies a strict concurrency model may be well-suited a first data set or application that depends upon stricter concurrency model, but may be too strict for a second data set or application that does not depend upon strict concurrency. Rather, the second data set or application may be sensitive to latency and/or throughput, which are unduly diminished by a quorum algorithm based upon an overly strict concurrency model.

As a third example, a large replica set may be hierarchically organized at different levels, and it may be difficult to organize the completion of transactions over a complex hierarchy; e.g., it may even be difficult for a selected transaction manager to keep track of all of the replicas that currently participate in the transaction for a broadly distributed data set, let alone establish unanimous agreement about a value and/or unanimous success in writing the value to the data set. Establishing a quorum among the entire replica set may not even be realistic in a highly dynamic replica set.

Presented herein are techniques for performing quorum-based transactions that may be well-suited for a dynamic, distributed, and/or hierarchically complex replica set. Such quorum-based techniques may be organized with a flexible but clear delegation of transactional roles among the replicas, and wherein a transaction may be applied over a complex hierarchy, such as a globally distributed data set, in a manner that is both organized and adaptive to the dynamic nature of the hierarchical structure.

The hierarchical nature of the quorum-based transactions may further enable the application of quorum in a broadly distributed manner, such as a globally distributed server set that manages a distributed data set with various transactional commitment guarantees. For example, the configuration of the server set to achieve consensus first at the level of the replica that receives a request, and then a broader consensus at a second and optionally higher levels of the nested hierarchy, may enable consensus and data consistency to be reached in a manner that is both rapidly committed and globally consistent, thus promoting rapid completion of transactions without compromising data integrity, as well as scalability of the distributed transactions to service a large number of concurrent transactions.

In a first embodiment of the presented techniques, a server of a replica set may facilitate the applications of a transaction request over a data set by operating as a leader of the replica set. The leader identifies a quorum count of replicas for the transaction and transmits the request to at least two followers of the replica set. The leader receives, from each follower, an acknowledgment of a local success of the transaction by each follower. Responsive to receiving an acknowledgment count of acknowledgments that meets the quorum count, the leader locally committing the transaction and transmits a result of the transaction to fulfill the transaction request.

In a second embodiment of the presented techniques, a server that comprise a replica of a replica set may apply transactions over a data set using the following method. The server may be designated as a leader for the replica set, and at least two other replicas may be designated as followers. The server may be configured to fulfill a transaction request by identifying a quorum count of replicas for the transaction and transmitting the request to at least two followers of the replica set. The leader may receive, from each follower, an acknowledgment of a local success of the transaction by the follower. Responsive to receiving an acknowledgment count of acknowledgments that meets the quorum count, the leader may locally commit the transaction and transmit a result of the transaction to fulfill the transaction request.

In a third embodiment of the presented techniques, a replica set comprising at least three replicas may be configured to apply transactions over a data set. The replicas of the replica set may be designated as a leader and at least two followers. A quorum count of replicas may be identified for the transaction, and the transaction request may be distributed to the at least two followers. The acknowledgments from each follower, indicating a local success of the transaction, may be indicated and compared with the quorum count. Responsive to determining that an acknowledgment count of acknowledgments meets the quorum count, the leader may locally commit the transaction, and a result of the transaction may be transmitted to fulfill the transaction request.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 7 is an illustration of an example scenario featuring a variety of quorum counts established for a variety of transaction types and consistency levels of a data set in accordance with the techniques presented herein.

FIG. 8 is an illustration of an example scenario featuring a nested transaction over a collection of replica sets in accordance with the techniques presented herein.

DETAILED DESCRIPTION

Figure 1:
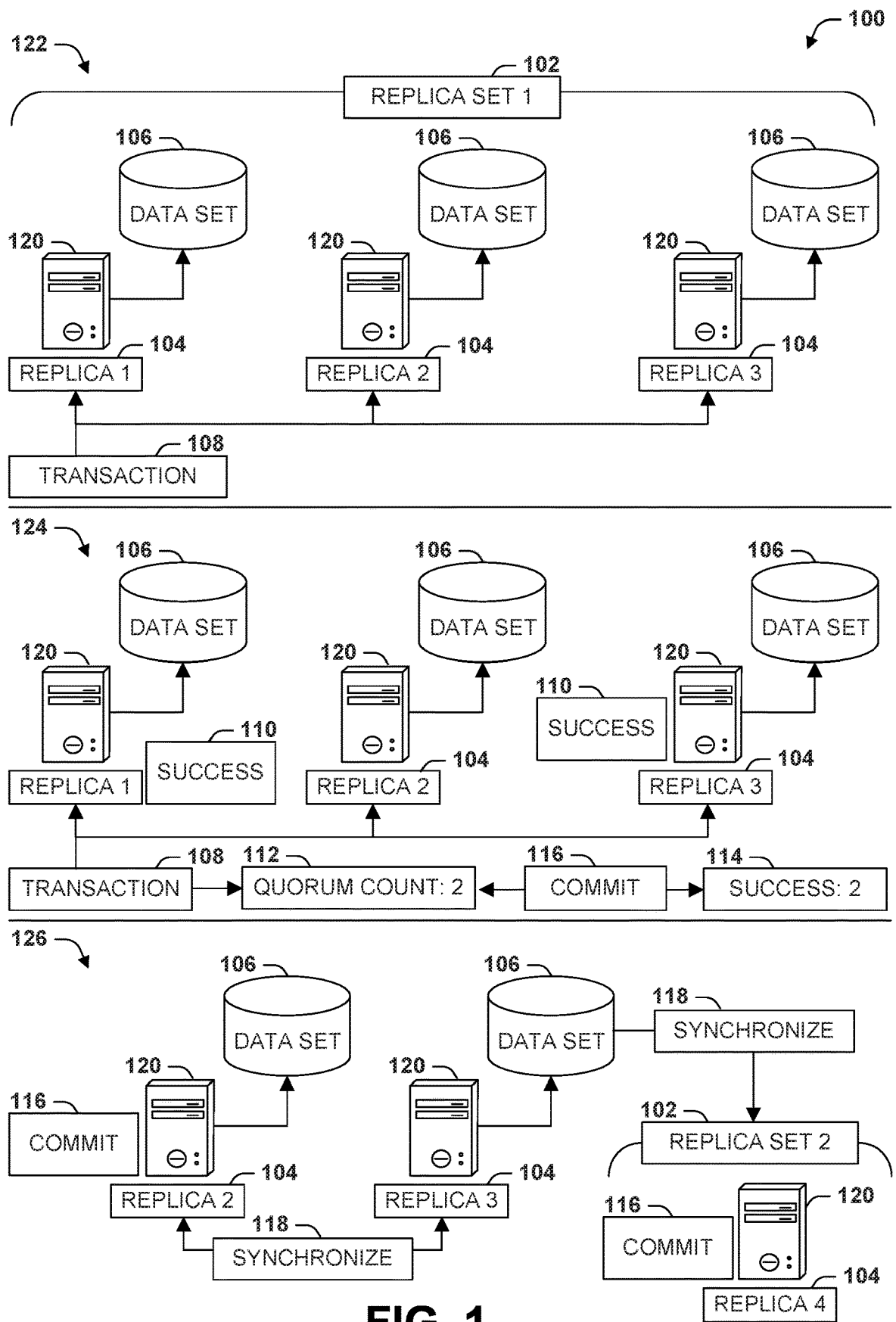
FIG. 1 is an illustration of an example scenario featuring a typical quorum-based application of a distributed transaction to a data set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A. Introduction

FIG. 1 is an illustration of an example scenario 100 featuring a typical execution of a transaction 108 by a replica set 102 of servers 120 that respectively provide a replica 104 of a data set 106. In this example scenario 100, the replicas 104 store substantially identical copies of the data set 106, and a consistency constraint may be attributed to the replica set 102, such that values of a data unit the data set 106 that are read by a first replica 104 will match the value of the same data unit when read from any other replica 104 of the replica set 102.

At a first time 122, a replica 104 may receive and/or initiate a request to perform a transaction 108 over the data set 106. The transaction 108 may comprise, e.g., a request to read a unit of data from the replica set 102, including a consensus of the value among the replicas 104; a request to write a value to a unit of data within the replica set 102, with a consistency guarantee by the replica set 102 that the value can later be read from any replica 104 of the replica set 102; and/or a combination of transactions over the same or different data units of the data set 106. The replicas 104 may therefore initiate a distributed transaction operation, e.g., using a variant of the Paxos consensus-building technique. The servers 120 may begin the transaction by attempting to commit 110 the transaction 108 locally (e.g., in the replica 104 of the data set 106 stored by the server 120). For a write transaction 108, the commit 110 may involve, e.g., verifying that an existing value of the data unit has not previously changed; obtaining an exclusive lock over the data unit; writing the value; verifying that the value has been successfully written; and releasing the exclusive lock. For a read transaction 108, the commit 110 may involve, e.g., obtaining an exclusive lock over the data unit; reading the value; and releasing the exclusive lock. A local commit 110 of a write transaction 108 may involve the completion of a persistent write to the data set 106, and a local commit 110 of a read transaction 108 may involve a successful read attempt over the data unit. By contrast, a read or write may fail for various reasons (e.g., an unavailability by the data unit in the data set 106; an inability to obtain an exclusive lock over the data unit, such as due to a preestablished exclusive lock by another process; and/or a failure to verify that the value of the data unit originally matched an expected value prior to a write or a written value following a write.

After the first time 122, one or a few of the replicas 104 of the replica set 102 may succeed 110 in locally applying the transaction 108 (e.g., successfully writing the value to the replica 104 of the data set 106 and/or successfully reading the value from the data set 106). However the success 110 of a first server 120 through a first replica 104 may not yet indicate a success 110 of the entire transaction 108; e.g., the other server 120 may fail to apply the transaction 108 locally to the replica 104. Instead, the replica set 102 may await the achievement of a designated number of successes 110 indicating that the replica set 102 has reached a consensus that the transaction 108 is successful. The particular number of successes 110 upon which the success of the transaction 108 is contingent may be identified as a quorum count 112, which may be compared with a count 114 of the number of successes 110 reported by the replica set 102. If the replica set 102 fails to meet the quorum count 112 within a designated period of time, or if a sufficient number of servers 120 indicate a failure to apply the transaction 108 locally to the replica 104 of the data set 106, the transaction 108 may be deemed to have failed. Any servers 120 that had reported success 110 may undo or "rollback" any changes that were provisionally made while attempting the transaction 108, leaving the replica set 102 in a state of consistency that existed at the beginning of the transaction 108.

On the other hand, if the count 114 of successes 110 meets (including exceeds) the quorum count 112, the transaction 108 may be deemed a success. At a second time 124, a comparison of the count 114 of successes 10 may match the quorum count 112, indicating the replica set 102 has reached a consensus that the transaction 108 succeeds. The replica set 102 may therefore initiate a commit 116 (e.g., converting values that were provisionally written to the data set 106 into persistent writes, which are to remain intact until the data set 106 is again updated; or reporting the consensus of a read value). The commit 116 may be initiated even if success 110 has not yet been achieved on all replicas 104, e.g., while the second replica 104 is still processing the transaction 108.

At a third time 126, the replica set 102 may finalize the transaction 108 by establishing consistency across a server set. As a first example, the third replica 104 that reported a success 110 of the transaction 108 may initiate a synchronization 118 of the replica 104 of the data set 106 with the second replica 104, and may therefore enable the second replica to perform a commit 116 that brings the second replica 104 into a state of consistency with the third replica 104. As a second such example, while the transaction 108 was applied over a first replica set 102, one or more replicas 104 of the replica set 102 may synchronize 118 with one or more replicas 104 of a second replica set 102, such as a cluster of servers 120 in a different rack, building, city, or region of the world, wherein the synchronization 118 propagates the commit 116 to a fourth replica 104 of the data set 120. In this manner, the replica set 120 may coordinate to maintain consistency and synchrony among the replicas 104 of the data set 106.

However, the typical distributed transaction process presented in the example scenario 100 of FIG. 1 may exhibit a number of potential disadvantages.

As a first such example, the distributed processing of the distributed transaction may be difficult to scale to a large replica set 102. For example, if the servers 120 communicate in a decentralized manner (e.g., by broadcasting messages), the replica set 102 may scale poorly to cover a large number of servers 120 and replicas 104, particularly if such servers 120 and replicas 104 are deployed at a distance, such as across regions in a broadly distributed transaction. For example, some distributed transactions 108 may utilize broadcast and/or multicast techniques to convey messages such as a local success 110, and discrepancies in the receipt, content, and/or ordering of the messages may cause different servers 120 to reach different conclusions about the status of the transaction 108, thus risking an inconsistency among the replicas 104. Alternatively or additionally, reliance on broadcast and/or multicast techniques may not be feasible in view of a large number of replicas 104 deployed over a large distance, where latency is high and the transmission of communication is unreliable.

As a second such example, the distributed transaction technique may not adapt well to changes in the replica set 102, such as the failure of one or more replicas 104 or the addition of one or more replicas 104. An unanticipated change in the composition of the replica set 102 may create problems in the processing of a transaction 108, potentially leading to an incorrect result and/or an avoidable failure of the transaction 108 that inefficiently consumes processing resources without advantage.

As a third such example, the distributed transaction technique may not be well-suited to the particular data set 106 to which the transaction is applied. For example, data sets 106 and consuming applications thereof may exhibit a range of performance characteristics, such as relative sensitivity and/or tolerance to conditions such as consistency. That is, a first data set 106 or application dependent thereupon may expect a strict degree of consistency; e.g., values written to a first replica 104 are to be propagated to the other replicas 104 as quickly and reliably as possible, even if such propagation entails a significant expenditure of computational resources, such that a read of a first replica 104 that closely follows a write of a second replica 104 is expected to produce the newly written value. A second data set or application dependent thereupon may be tolerant of a low degree of consistency, e.g., an eventual consistency model in which a degree of delay between the writing of the value on a first replica 104 and the appearance of the written value on a second replica 104 is tolerable. Moreover, the expected consistency of a data set 106 or application may be contingent on a number of factors, such as the type of data stored in the data set 106; the type of operation applied to the data set 106; and/or the geographic region from which the transaction 108 was initiated. Other performance characteristics that may affect the use of the data set 106 include latency, throughput, scalability, availability, and/or consistency.

However, the replica set 102 may not configured to choose the quorum count 112 in particular view of the data set 106 and/or surrounding circumstances. Rather, the replica set 102 may be configured to choose a typical quorum count 112 and utilize a typical quorum consensus process. In some circumstances, the selected process exhibit overly strict consistency for the application or data set 106; e.g., application or data set 106 may be marginally tolerant of temporary or minor inconsistencies, but more sensitive to delays and/or failures in the application of transactions 108. If the quorum count 112 is set too high, the replica set 108 may exhibit avoidable delays and/or higher failure rates in processing transactions 108 that create problems for the application or data set 106, in furtherance of a level of consistency that does not necessarily benefit the application or data set 106. Conversely, the transaction process may not be strict enough for some data sets 106 or applications; e.g., quorum count 112 may be set too low, such that the replica set 102 exhibits brief or minor inconsistencies that nevertheless impose a great disadvantage on the data set 106 or application. These and other disadvantages may arise from typical distributed transactional processes such as the example scenario 100 of FIG. 1.

B. Presented Techniques

Figure 2:
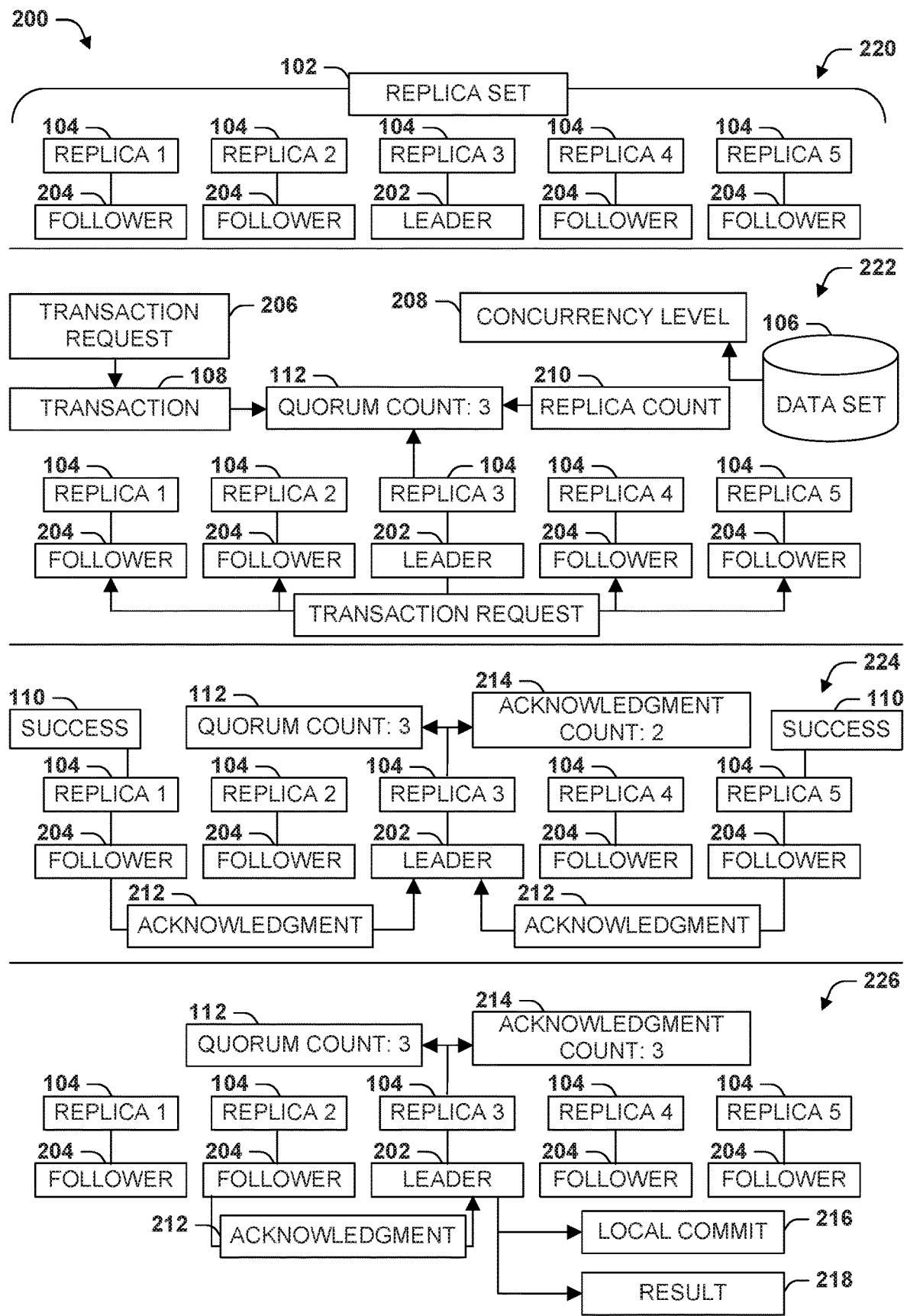
FIG. 2 is an illustration of an example scenario featuring a quorum-based application of a distributed transaction to a data set in accordance with the techniques presented herein.

FIG. 2 is an illustration of an example scenario 200 featuring a distributed transaction process in accordance with the techniques presented herein. In this example scenario 200, a replica set 102 comprises a set of servers 120 that each serves as a replica 104 of a data set 106. At a first time 220, the replicas 104 are designated as fulfilling a role in the transactional process: one replica 104 is designated as a leader 202, and the remaining replicas 104 are designated as followers 204. At a second time 222, a transaction request 206 arises to apply a transaction 108 over the replicas 104 of the data set 106. The leader 202 may transmit the transaction request 206 to the followers 204 to initiate the distributed transaction. Additionally, the leader 202 may determine a quorum count 112 for the transaction 108 based on an evaluation of factors such as a replica count 210 of the replica set 102 (e.g., the number of replicas 104 participating in the transaction 108) and a performance characteristic of the data set 106, such as a concurrency level 208 (e.g., the degree of consensus that is to be established over the replica set 102 for the transaction 108). Other factors may also be considered, such as a transaction type of the transaction 108; a workload to which the transaction 108 belongs; and/or a load that is currently carried by the replica set 102.

At a third time 224, the servers 120 designated as followers 204 may endeavor to apply the transaction 108 locally to each replica 104. Each follower 204 that succeed in applying the transaction 108 may transmit an acknowledgment 212 to the leader 202. The leader 202 may receive and collect the acknowledgments 212 and tally an acknowledgment count 214, which the leader 202 may compare with the previously established quorum count 112. Before the acknowledgment count 214 meets the quorum count 112, the leader 202 may refrain from applying the transaction 108 to the local replica 104 of the leader 202; alternatively, the leader 202 may endeavor to apply the transaction 108 to the local replica 104 concurrently with the followers 204, while refraining from committing the transaction 108 to the replica 104.

At a fourth time 226 in the example scenario 200 of FIG. 2, the leader 202 may receive enough acknowledgments 212 from the followers 204 to meet the quorum count 112 (e.g., receiving at least three acknowledgments 212 from the four followers 204), indicating that the replica set 102 has reached a consensus that the transaction 108 has succeeded to a degree that satisfies the concurrency level 208 of the data set 106 and/or application. The leader 202 may respond by locally committing 216 the transaction 108, and by transmitting a result 218 of the transaction 108 (e.g., reporting to a source of the transaction request 206 that the transaction 108 has succeeded, and optionally including a read value of one or more data units in response to a read transaction 108). The followers 204 may also locally commit 216 the transaction 108 to each replica 104. Alternatively, if the acknowledgment count 214 fails to meet the quorum count 112 (e.g., due to a failure of a number of replicas 104 and/or exceeding a timeout without the acknowledgment count 214 meeting the quorum count 112), the leader 202 may conclude that the transaction 108 has failed, and the replicas 104 may initiate recovery processes, such as reversing provisional changes made to the replicas 104 during the evaluation of the transaction 108. In this manner, the replica set 102 may complete the application of the transaction 108 to the replicas 104 of the data set 106 in accordance with the techniques presented herein.

C. Technical Effects

The distributed transaction processing techniques presented herein may exhibit a number of technical advantages as compared with other distributed transaction processing techniques, such as the example scenario 100 of FIG. 1.

A first technical effect that may arise from the techniques presented herein involves the scalability of the distributed transaction process. The designation of a leader 202 that manages the transaction, e.g., by designating the followers 204, transmitting the transaction request to the followers 204, collecting the acknowledgments 212, tallying the acknowledgment count 214, comparing the acknowledgment count 214 with the quorum count 112, initiating the local commit 216 in response to a success of the transaction 108, and/or transmitting the result 218 of the transaction 108 may provide a centralized and controlled point of management of the transaction 108, which may enable transactions to succeed more often and more efficiently than a decentralized process in which the replicas 104 operate as peers.

A second technical effect that may arise from the techniques presented herein involves the adaptability of the replica set 102 to changes. By establishing the quorum count 112 for the transaction 108 (e.g., in view of a current replica count 210 of replicas 104 in the replica set 102), the leader 202 may promote the completion of transactions 108 in view of the composition of the replica set 102. The leader 202 may take the failure, removal, and/or addition of replicas 104 into consideration while determining the quorum count 112 and the success or failure of the transaction 108.

A third technical effect that may arise from the techniques presented herein involves the adaptability of the query processing technique to performance characteristics of the data set 106 or an application thereof, and/or of the replica set 102. As a first such example, the leader 202 may select the quorum count based on a relative sensitivity and/or tolerance of the data set 106 and/or application to the consistency of the data set 106. For example, the leader 202 may increase the quorum count 112, even to the point of unanimity, for data sets 106 and/or applications that are highly sensitive to inconsistency even if ephemeral or minor. Conversely, the leader 202 may decrease the quorum count 112, even to the point of a single acknowledgment 212, for data sets 106 and/or applications that are tolerant of inconsistency, even if protracted and/or significant. Such adjustments of the quorum count 112 may also be based on other performance characteristics of the data set 106 and/or application, such as sensitivity to and/or tolerance of latency in completing the distributed transactions 108; scalability to handle a larger volume of distributed transactions 108; and/or resiliency of the data set 106 to prevent and/or recover from data loss, such as the failure of one or more replicas 104. Such adjustments may also be based on a transaction type 108, e.g., a type of access requested by the transaction 108 (e.g., a read transaction, a record creation transaction, a record duplication transaction, a record update transaction, and/or a record deletion transaction); a value or significance of the data that is utilized in the transaction 108; and/or a workflow or context in which the transaction 108 is requested. Such adjustments may also be based on the achievable capabilities of the replica set 104, such as the current computational load handled by the replica set 102. By adjusting the quorum count 112 with which the replica count 210 is compared based on such factors, the leader 202 may perform the distributed transaction 208 over the replicas 104 of the data set 106 in a more contextually suitable manner, potentially increasing the concurrency, throughput, efficiency, resiliency, and/or success rate of the distributed transactions 108. Many such advantages may arise from the application of distributed transactions 108 to the data set 106 in accordance with the techniques presented herein.

D. Example Embodiments

Figure 3:
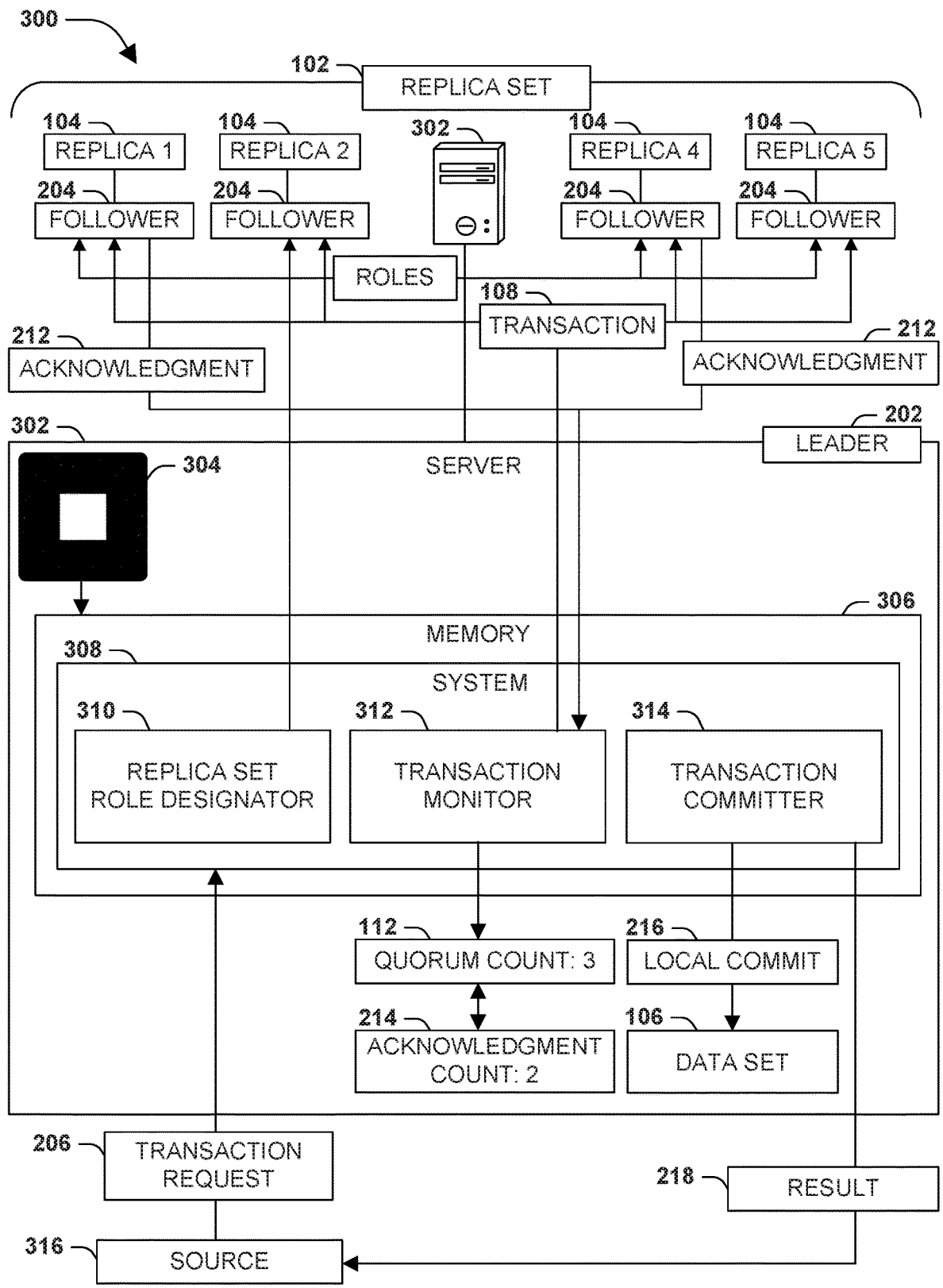
FIG. 3 is a component block diagram illustrating an example server featuring an example system for applying transactions to a data set stored by a replica set of replicas in accordance with the techniques presented herein.

FIG. 3 is an illustration of an example scenario 300 featuring some example embodiments of the techniques presented herein, including an example server 302 that performs a transaction 108 over a replica set 102 of replicas 104 of a data set 106, and an example system 308 operating on such a server 302, in accordance with the techniques presented herein.

In this example scenario 300, the example server 302 comprises a processor 304 and a memory 306 (e.g., a memory circuit, a platter of a hard disk drive, a solid-state storage device, or a magnetic or optical disc) encoding instructions that, when executed by the processor 304 of the example server 302, cause the example server 302 to process transactions 108 in accordance with the techniques presented herein. As an example, the instructions may comprise a runtime stored by and/or accessible to the example server 302 that encodes instructions that may be invoked by one or more processes executing on the example server 302 to process transactions 108. More particularly, in this example scenario 300, the instructions encode a set of components of an example system 308, wherein the interoperation of the components of the example system 308 causes the server 302 to process transactions 108 in accordance with the techniques presented herein.

The example system 308 includes a replica set role designator 301 that designates the server 302 as a leader 202 of the replica set 102 for the transaction 108, and that designates at least some of the other replicas 104 of the replica set 1023 as followers 204. The roles may be designated, e.g., on an ad hoc basis for the selected transaction 108, and/or may comprise a temporary or persistent designation for any transactions 108 that are processed by the replica set 102 within a selected period of time.

The example system 308 also includes a transaction monitor 312 that receives, from a source 316, a transaction request 206 to apply the transaction 108 to the replica set 102 in the following manner. The transaction monitor 312 identifies a quorum count 112 of replicas 104 for the transaction 108, and transmits the transaction request 206 to at least two followers 204 of the replica set 102. The transaction monitor 312 further receives, from each follower 204, an acknowledgment 212 of a local success of the transaction 108 by each follower 204 (e.g., a successful provisional write or commit of a write transaction 108 to the replica 104 of the follower 204, or a successful read of a value of a data unit as indicated by a read transaction 108). The transaction monitor 312 may tally such acknowledgments 212 as an acknowledgment count 214, and may determine a success of the transaction on condition of the acknowledgment count 214 meeting the quorum count 112.

The example system 308 also comprises a transaction committer 314 that, responsive to receiving an acknowledgment count 214 of acknowledgments 212 that meets the quorum count 112, locally commits the transaction 108 on the replica 104 of the leader 202, and that transmits to the source 316 a result 218 of the transaction to fulfill the transaction request 206 (e.g., an acknowledgment of the successful application of a write transaction to a quorum of replicas 104 of the replica set 102, and/or a consensus agreement of a read transaction 108 and the value that has been read from the data set 106). In this manner, the components of the example system 308 enable the example server 302 to apply the transaction 108 over the replica set 102 in accordance with the techniques presented herein.

Figure 4:
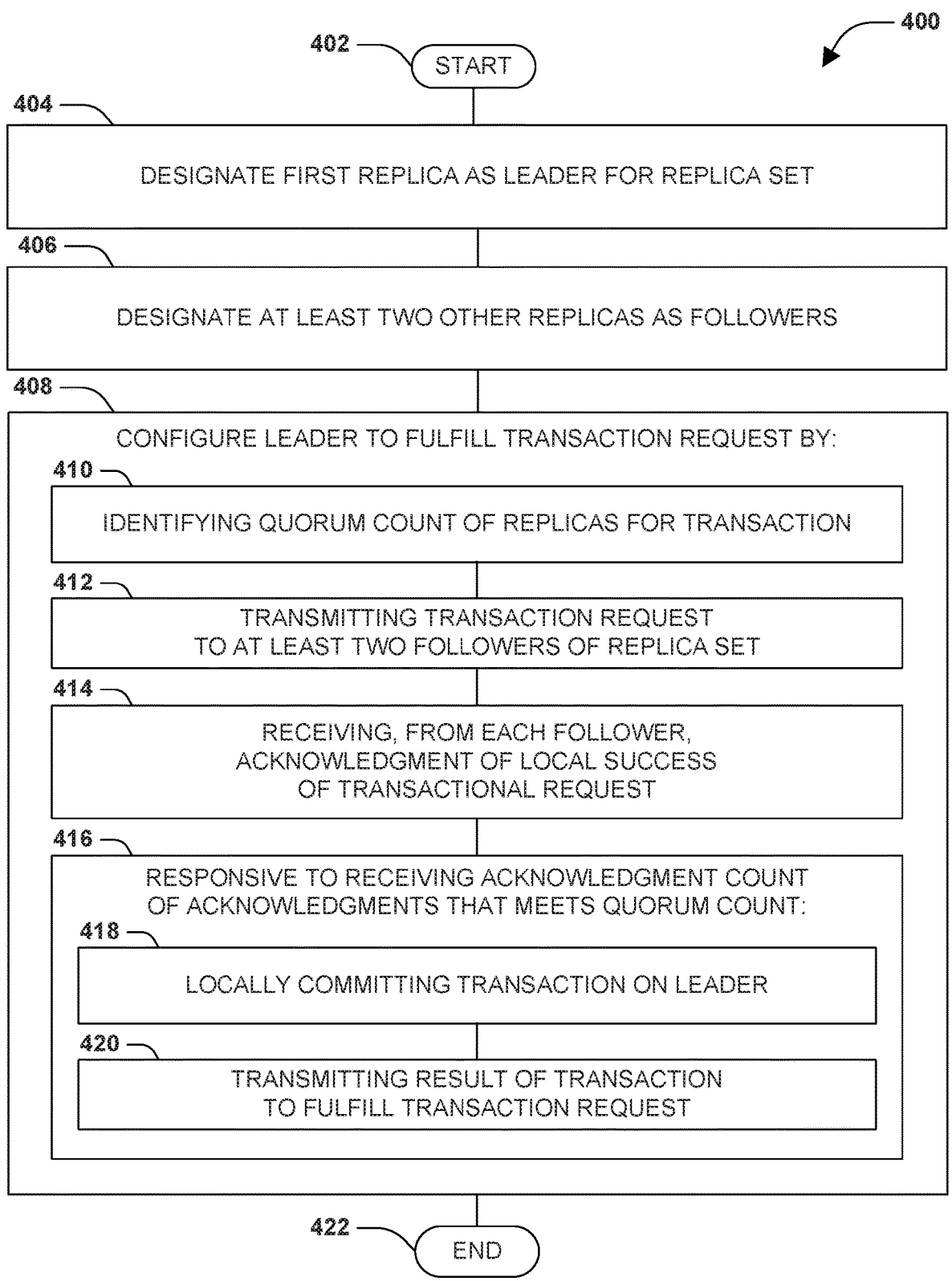
FIG. 4 is a flow diagram illustrating an exemplary method of configuring a replica set to apply transactions to a data set in accordance with the techniques presented herein.

FIG. 4 is an illustration of an example scenario featuring a third example embodiment of the techniques presented herein, wherein the example embodiment comprises an example method 400 of configuring a replica set 102 of replicas 104 of a data set 106 to apply transactions 108 over the data set 106 in accordance with techniques presented herein. The example method 400 involves a device comprising a processor 304, and may be implemented, e.g., as a set of instructions stored in a memory 306 of the device, such as firmware, system memory, a hard disk drive, a solid-state storage component, or a magnetic or optical medium, wherein the execution of the instructions by the processor 304 causes the device to operate in accordance with the techniques presented herein. As an example, the instructions may comprise a runtime stored by and/or accessible to the example server 302 that encodes instructions that may be invoked by one or more processes executing on the example server 302 to process transactions 108.

The example method 400 begins at 402 and involves designating 404 a first replica 104 as a leader 202 for the replica set 102. The example method 404 also involves designating 406 at least two other replicas 104 of the replica set 102 as followers 204. The example method 404 also involves configuring 408 the leader 202 to fulfill a transaction request 206 for a transaction 108 in the following manner. The example method 404 involves configuring 408 the leader 202 to identify 410 a quorum count 112 of replicas 104 for the transaction 108. The example method 404 also involves configuring 408 the leader 202 to transmit 412 the transaction request 206 to at least two followers 204 of the replica set 102. The example method 404 also involves configuring 408 the leader 202 to receive 414, from each follower 204, an acknowledgment 212 of a local success of the transaction 108. The example method 404 also involves configuring 480 the leader 202 to, responsive to receiving 416 an acknowledgment count 214 of acknowledgments 212 that meets the quorum count 112, locally commit 418 the transaction 108 on the replica 104 of the leader 202, and transmit 420 a result 218 of the transaction 108 to fulfill the transaction request 206. In this manner, the example method 400 enables the leader 202 of the replica set 102 to apply the transaction 108 over the data set 106 stored by the replicas 104, and so ends at 422.

Figure 5:
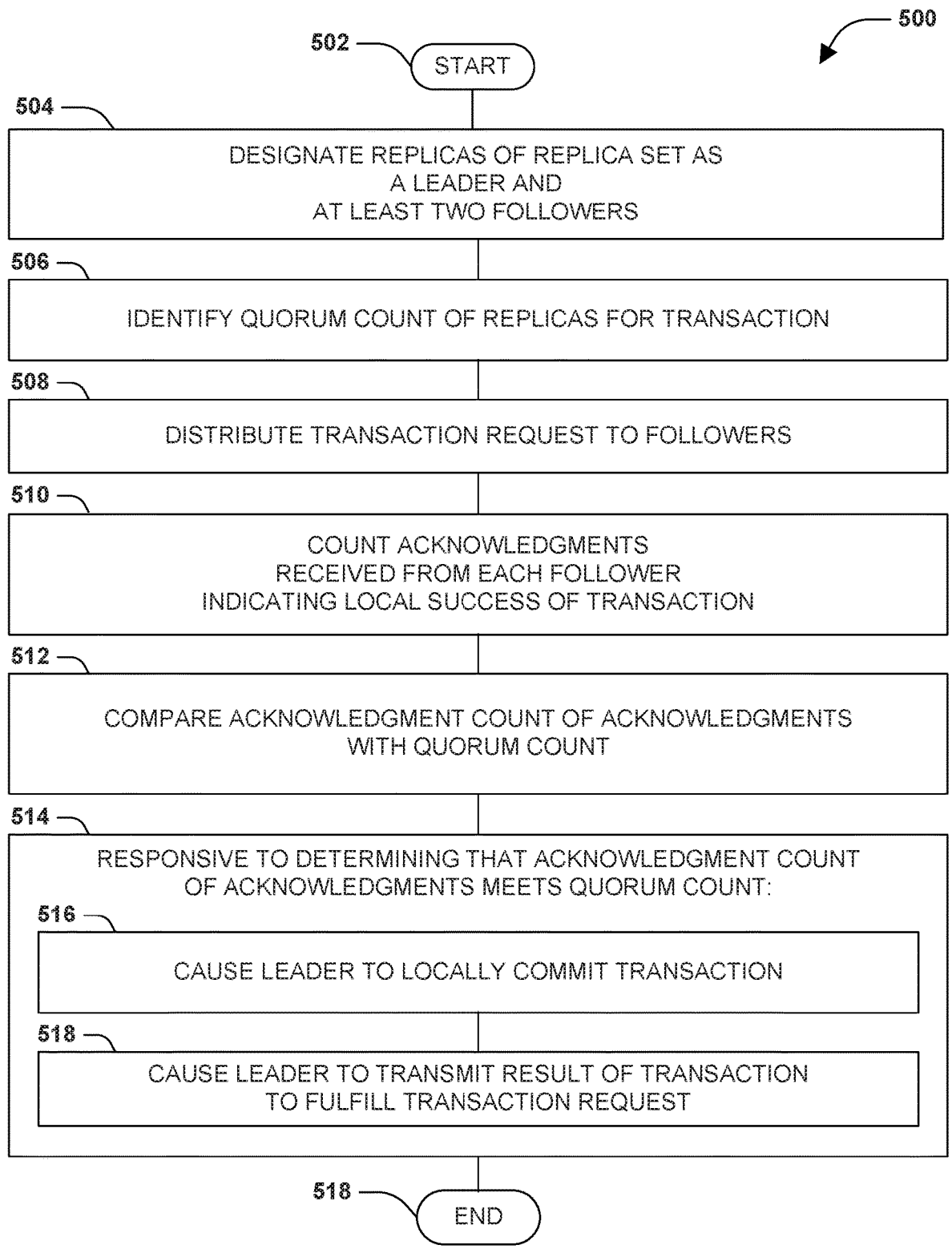
FIG. 5 is a flow diagram illustrating an exemplary method of applying a transaction to a data set stored by a replica set of replicas in accordance with the techniques presented herein.

FIG. 5 is an illustration of an example scenario featuring a fourth example embodiment of the techniques presented herein, wherein the example embodiment comprises an example method 500 of configuring a replica set 104 of at least three replicas 102 to apply a transaction 108 over a data set 106 in accordance with techniques presented herein. The example method 500 involves a device comprising a processor 304, and may be implemented, e.g., as a set of instructions stored in a memory 306 of the device, such as firmware, system memory, a hard disk drive, a solid-state storage component, or a magnetic or optical medium, wherein the execution of the instructions by the processor 304 causes the device to operate in accordance with the techniques presented herein. As an example, the instructions may comprise a runtime stored by and/or accessible to the example server 302 that encodes instructions that may be invoked by one or more processes executing on the example server 302 to process transactions 108.

The example method 500 begins at 502 and involves designating 504 the replicas 104 of the replica set 102 as a leader 202 and at least two followers 204. The example method 500 also involves identifying 506 a quorum count 112 of replicas 102 for the transaction 108. The example method 500 also involves distributing 508 the transaction request 206 to the at least two followers 204. The example method 500 also involves counting 510 acknowledgments 212 received from each follower 204 indicating a local success of the transaction 108 on the replica 104 of each follower 204. The example method 500 also involves comparing 512 an acknowledgment count 214 of the acknowledgments 212 with the quorum count 112. The example method 500 also involves, responsive to determining 514 that the acknowledgment count 214 of acknowledgments 212 meets the quorum count 112, causing 516 the leader 202 to locally commit the transaction 108 to the replica 104 of the leader 202 and transmit 518 a result 218 of the transaction 108 to fulfill the transaction request 206. In this manner, the example method 500 enables the replica set 102 to apply the transaction 108 over the data set 106 stored by the replicas 104, and so ends at 422.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 6:
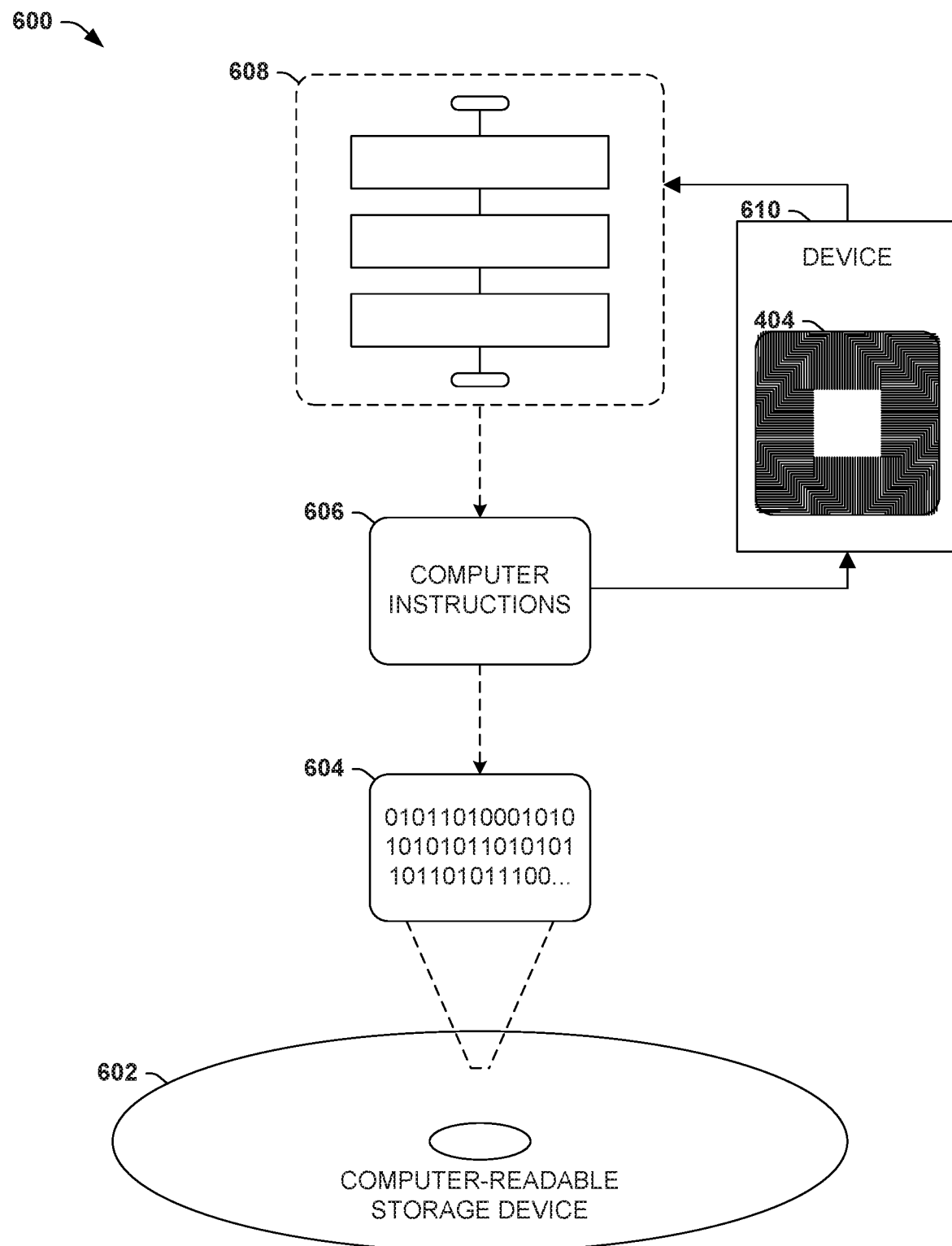
FIG. 6 is an illustration of an example computer-readable medium storing instructions that provide an embodiment of the techniques presented herein.

An example computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 604. This computer-readable data 604 in turn comprises a set of computer instructions 606 that, when executed on a processor 304 of a server, cause the server to operate according to the principles set forth herein. For example, the processor-executable instructions 606 may encode a system that causes the server to apply transactions 108 to a replica set 102 of replicas 104 of a data set 106, such as the example system 308 of FIG. 3. As another example, the processor-executable instructions 606 may encode a method of causing a server 302 serving as a replica 104 of a replica set 102 to apply transactions 108 to the data set 106 stored by the replica set 102, such as the example method 400 of FIG. 4. As yet another example, the processor-executable instructions 606 may encode a method of causing a replica set 102 of replicas 104 to apply transactions 108 over the replicas 104 of a data set 106, such as the example method 500 of FIG. 5. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example server 302 of FIG. 3; the example system 308 of FIG. 3; the example method of FIG. 4; the example method 500 of FIG. 5; the example device 602 and/or example method 608 of FIG. 6; and an example runtime existing on an example server 302 that may be invoked by one or more processes executing on the example server 302 to process transactions 108) to confer individual and/or synergistic advantages upon such embodiments.

E1. Scenarios

A first aspect that may vary among implementations of these techniques relates to scenarios in which the presented techniques may be utilized.

As a second variation of this first aspect, the presented techniques may be utilized with a variety of servers that serve as replicas 104 of a replica set 102, such as workstations, laptops, consoles, tablets, phones, portable media and/or game players, embedded systems, appliances, vehicles, and wearable devices. The server may also comprise a collection of server units, such as a collection of server processes executing on a device; a personal group of interoperating devices of a user; a local collection of server units comprising a computing cluster; and/or a geographically distributed collection of server units that span a region, including a global-scale distributed database. Such devices may be interconnected in a variety of ways, such as locally wired connections (e.g., a bus architecture such as Universal Serial Bus (USB) or a locally wired network such as Ethernet); locally wireless connections (e.g., Bluetooth connections or a WiFi network); remote wired connections (e.g., long-distance fiber optic connections comprising Internet); and/or remote wireless connections (e.g., cellular communication). Additionally, such data sets 106 may be accessed by various clients, such as a client process on one or more of the replicas 104 of the replica set 102; other servers within a server group that includes the data set 106; and/or various client devices that utilize the data set 106 and/or replica set 104 on behalf of one or more users and/or other devices.

As a second variation of this first aspect, the presented techniques may be utilized with a variety of data sets 106. For example, the data sets 106 may be organized according to a variety of data models, such as a relational database comprising tabular data organized into tables comprising sets of attributes and sets of rows presenting values for the respective attributes; graph data comprising a graph of nodes with interconnecting edges; key/value pairs of keys and associated values; and documents provided as structured or unstructured collections of entities. Such data sets 106 may also be used in a variety of circumstances, such as data warehousing; content provided through a content system such as a webserver; and object systems for an application or operating system. Some data sets 106 may comprise a hybrid of several data models, which may be aggregated in a horizontal manner (e.g., a collection of items of which some items are provided and/or requested in a first native item format, such as relational data, and other items are provided and/or requested in a second native item format, such as entities within documents) and/or non-horizontal manner (e.g., a collection of items in a first native item format, such as entities within documents, may be described by metadata represented by other items provided in a second native item format, such as relational data).

E2. Role Designation and Quorum Count Selection

A second aspect that may vary among embodiments of the presented techniques involves the manner of designating the roles of the replicas 104 and the selecting the quorum count 112 for processing transactions 108 over the data set 106.

As a first variation of this second aspect, the roles of the replicas 104 as leader 202 or follower 204 may be determined in various ways. As a first such example, the roles may be determined by a selected replica 104 of the replica set 102, such as the replica 104 that received the transaction request 206 from the source 316, or a designated replica 104 of the replica set 102 that performs such determinations. Alternatively, the replicas 104 of the replica set 102 may designate the leader 202 and followers 204 by consensus, e.g., a volunteer, nomination, and/or voting process; by a turn-taking process; by contextual circumstances, such as the relative computational loads of the replicas 104; and/or by random selection. As a second such example, the roles may be determined for a particular transaction 108 (e.g., as an ad-hoc selection of roles responsive to the receipt of the transaction request 206), and/or on a static basis (e.g., designations of roles that persist over two or more transactions 108). In some scenarios, designations of leader 202 and followers 204 may be maintained until and unless the designations appear to be inadequate (e.g., a selected replica 104 may serve as a leader 202 for transaction processing until its computational load exceeds a threshold that may incur delay in the processing of transactions 108, at which point a new leader 202 may be selected). As a third such example, the designation of leader 202 and followers 204 may adapt based on changes to the replica set 104. For example, the addition of a replica 104 (which may result from an allocation of additional resources to the replica set 102 to handle a computational load) may result in a transfer of the designation of leader 202 from a current replica 104 to the newly added replica 104. Alternatively, a failure of a replica 104 or removal of a replica 104 from the replica set 102 that had been designated as a leader 202 for transaction processing may result in a redesignation of a follower 204 to a leader 202. A leader 204 may be configured to respond to such changes in the replica set 102, e.g., by initially selecting the quorum count 112 according to an initial replica count of replicas 104 in the replica set 104, and on condition of a replica count change, adjusting the quorum count 112 according to the updated replica count of replicas 104 in the replica set 102.

As a second variation of this second aspect, the selection of a quorum count 112 may be established based on a variety of factors.

As a first example of this second variation, a transaction 108 may further comprise a transaction type, such as a read transaction type or a write transaction type. The quorum count 112 may be selected differently for the different transaction types; e.g., a read transaction 108 may involve a quorum count 112 that is met by a read quorum count, and a write transaction 108 may be met by a write quorum count 112 that is different than the read quorum count 112. The quorum count 112 for a particular transaction 108 may therefore be selected based, at least in part, according to the transaction type of the transaction 108. Further examples of transaction types that may affect the selection of quorum count 112 include, e.g., a workload to which the transaction 108 belongs; a significance of the transaction 108 in the context of an application (e.g., whether the data written by a write transaction 108 is highly significant data that is bound by a higher level of consistency or less significant data for which a lower level of consistency may be tolerable).

As a second example of this second variation, the quorum count 112 may include or exclude the leader 202 as a replica 104 of the replica set 102. That is, in some circumstances, the acknowledgment count 214 may include an attempt by the leader 202 to apply the transaction 108 locally to the replica 104 of the leader 202, either concurrently with the attempts of the followers 204 or subsequent to the attempts of the followers 204. Alternatively, the leader 202 may be excluded from the quorum count 112, such that the transaction 108 succeeds or fails based on the attempts of the followers 204 to apply the transaction locally to each replica 104. That is, the leader 202 may defer the commit of the transaction 108 to the replica 104 of the leader 202 until and unless the transaction 108 succeeds among the followers 204. This variation may be advantageous, e.g., for economizing the resource of the leader 202 (e.g., deferring processing of the transaction 108 by the leader 202 until it is clear that the transaction 108 has succeeded among the followers 204), and therefore preserving the computational resources of the leader 202 for the service of the leader 202 to the replica set 102. In some variations, the inclusion and exclusion of the leader 202 in the quorum count 112 may be based upon a transaction type; e.g., the leader 202 may be excluded from a read quorum count for read transactions 108 and included in a write quorum count for write transactions 108, which may balance the conservation the computational resources of the leader 202 with the maintenance consistency of updates to the data set 106 over the replica 104 of the leader 202 as well as the replicas 104 of the followers 204. Alternatively or additionally, the leader 202 may entirely refrain from participating in read transactions;

e.g., the leader 202 may locally commit the transaction 108 to the replica 104 of the leader 202 on condition of the transaction comprising a write transaction type, and may refrain from locally committing the transaction 108 to the replica 104 of the leader 202 on condition of the transaction 108 comprising a read transaction type. Instead, read transactions 108 may be fulfilled by transmitting the result 218 of the transaction 108 directly from a follower 204 to the source 316 of the transaction request 206 from a follower of the replica set. These variations may be advantageous, e.g., for reserving the fulfillment of read transactions 108 by the followers 204 that are not involved in managing the transaction 108 for the replica set 102, and preserving the computational resources of the leader 202 for the monitoring and management of the transactions 108 on behalf of the replica set 102.

As a third variation of this second aspect, the quorum count 112 may be based at least in part on a performance characteristic of the data set 106 or an application thereof. As a first such example, the data set 106 may be associated with a consistency level, and the selection of the quorum count 112 of replicas 104 for a transaction 108 may be based, at least in part, on the consistency level of the data set 106. For example, if the data set 106 is restricted by a strict consistency level (e.g., where consistency of read updates through various replicas 104 promptly following a write is of high priority), the quorum count 112 may be selected as a majority quorum count, and even scaling up to a unanimous quorum count for scenarios in which no inconsistency is tolerable. Alternatively, if the data set 106 is restricted by an eventual consistency level, the quorum count 112 may be reduced even as low as a single-replica quorum count (i.e., the value may be provided by any replica 104 of the replica set 102 irrespective of the staleness of the value).

Other performance characteristics of the data set 106 may also be taken into consideration during the selection of the quorum count 112. As a first such example, the quorum count 112 may be selected based upon a sensitivity and/or tolerance of the data set 106 or an application thereof to latency; e.g., transactions 108 applied to data sets 106 that involve applications for which reduced latency is a highly significant factor may motivate the selection of a lower quorum count 112 to expedite the completion of transactions 108. As a second such example, the quorum count 112 may be selected based upon a sensitivity and/or tolerance of the data set 106 or an application thereof to scalability and throughput; e.g., transactions 108 applied to data sets 106 that are queried at a high volume and/or that scale to a large volume of concurrent transactions 108 may motivate the selection of a lower quorum count 112 to promote the scalability and throughput of the transaction processing. Conversely, and as a third such example, the quorum count 112 may be selected based upon a sensitivity and/or tolerance of the data set 106 or an application thereof to availability and/or data loss; e.g., transactions 108 applied to data sets 106 for which data loss and/or unavailability are to be minimized may promote an increase of the number of replicas 104 of the data set 102, which may also involve increasing the quorum count 112 to enable transactions 108 to be evaluated by the larger replica set 102 while maintaining the desired consistency level.

As a fourth variation of this second aspect, the quorum count 112 for a transaction 108 may be selected and/or adjusted based upon contextual factors, such as the bandwidth and/or computational load of the replica set 102. For example, if the replica set 102 is concurrently processing a large computational load and/or experiencing limited bandwidth, it may be desirable to reduce the quorum count 112, e.g., to maintain a latency within which transactions 108 may be processed with a modest reduction of consistency. Conversely, if the replica set 102 has plentiful computational load and bandwidth, it may be desirable to increase the quorum count 112 to utilize such resources as enhanced consistency.

FIG. 7 is an illustration of an example scenario in which a quorum count 112 is selected by a leader 202 for a transaction 108 based upon a plurality of factors, including a consistency model 702 of the data set and a transaction type 704 of the transactions 108 to be processed by the replica set 102. In this example scenario 700, write transactions 708 are processed according to a majority quorum count 112, but read transactions 706 may be processed with a variable quorum count 112 in accordance with the consistency model 701 of the data set 106.

As a first such example, if the data set 106 is associated with a strict consistency level 710, the quorum count 112 is selected as a majority quorum; i.e., a majority of the followers 204 (optionally including or excluding the leader 202) may have to agree on the read value before a result 218 is returned.

As a second such example, if the data set 106 is restricted by a bounded staleness consistency level 712 (e.g., where values of the data set 106 that are provided by the replica set 102 are not to exceed a staleness bound), the quorum count 112 may be selected as a minority quorum count, and optionally on further condition that acknowledgments are time-bound within the staleness boundary to ensure that the staleness of the result 218 does not exceed the boundary.

As a third such example, the data set 106 is restricted by a session consistency level 714 (e.g., where consistency is only guaranteed among the data within a particular session), e.g., where the read transaction request 206 indicates a log sequence number of the latest transaction of the data exhibited by the session. In this circumstance, the quorum count 112 may be reduced, even as low as a single replica quorum count 112, on condition of selecting a replica 714 fulfilling the transaction request 206 that has received and processed updates of the replica 104 at least up to the log sequence number included in the read transaction request 206, such that the read value is not older or more stale than the current staleness of the session (i.e., the replica 104 will not return a read value that has a lower and/or older log sequence number than the last log sequence number received by the session).

As a fourth such example, if the data set 106 is restricted by an eventual consistency level 716, the quorum count 112 may be reduced even as low as a single-replica quorum count 112 (i.e., the value may be provided by any replica 104 of the replica set 102 irrespective of the staleness of the value). In this manner, an embodiment of the presented techniques may adapt the selection of the quorum count 112 for a transaction 108 based on the sensitivity and/or tolerance of multiple factors by the data set 108 and/or an application thereof. Many such variations may be utilized in the selection of quorum counts 112 for transactions 108 applied to the data set 106 by the replica set 102 in accordance with the techniques presented herein.

E3. Processing Distributed Transactions

A third aspect that may vary among embodiments of the techniques presented herein involves the manner of processing transactions 108 over the replica set 102.

As a first variation of this third aspect, the processing of the transaction 108 may be orchestrated in numerous ways. As a first such example, if the transaction 108 comprises a combination of operations, such as a sequence of write operations and/or logical tests upon which other transactions are to be conditioned, the leader 202 may coordinate the timing in which such operations are applied by the followers 204. Alternatively or additionally, the leader 202 and/or followers 204 may individually control the timing of such applications over the local replica 104 of the data set 106. As a second such example, the processing of the transaction 108 may be bounded, e.g., by a timeout value within which acknowledgments 212 of successful applications of the transaction 108 to replicas 104 are to be received, and/or a failure count of failures as reported by the followers 204. In addition to coordinating the successful completion according to the quorum count 112, the leader 202 may also coordinate the failure of the transaction 108, e.g., by initiating a rollback operation on the followers 204. As a third such example, the leader 202 may adjust the processing of the transaction 108 by the replica set 102 in response to various conditions, such as the failure or inaccessibility of one or more replicas 104; the introduction of new replicas 104; changes to the data set 106; and/or fluctuating computational load. As an example, the leader 202 may respond to such changes by aborting the transaction 108 and reinitiating in view of the updated replica set 102. Alternatively, the leader 202 may adjust various parameters of the processing of the transaction 108 in response to the changing replica set 102, e.g., by increasing or decreasing the quorum count 112 as replicas 104 are added to and/or removed from the replica set 102. The leader 202 may also limit such adaptation within various conditions, such as a minimum replica count 210 and/or a maximum replica count 210 of replicas 104 over which the transaction 108 is validly processed, such that a dynamic change of the replica set 102 that exceeds either bound during the processing of the transaction 108 results in an abort of transaction 108.

As a second variation of this third aspect, a transaction 108 may be processed over the replicas 104 of the data set 106 while allocating, to the servers 120 for each replica 104, a resource allocation of computational resources. For example, each server 120 may partition a processing capacity over a number of tenant processes, and may allocate a processing capacity partition (e.g., a time slice of a processor, a memory quota, or a capacity of network bandwidth) to the processing of the transaction 108 over the replica 104. In some scenarios, the replica 104 that has been designated as a leader 202 may increase the resource allocation of computational resources that are allocated to the processing of the transaction 108, on account of the additional computational load involved in monitoring and/or managing the progress of the transaction 108 through the replica set 102. Such allocation may also be increased in order to expedite the completion of the transaction 108; e.g., it may be appreciated that the leader 202 may become a bottleneck in the transaction processing workflow, and a shortage of computational resources may induce a delay between the completion of the transaction 108 by the followers 204 and the response of the leader 202.

As a third variation of this third aspect, the transaction 108 may involve a write transaction 108 that is associated with a log sequence number, i.e., a monotonically increasing number that indicates the order in which writes to the data set 106 have been requested and/or are to be applied. Each replica 104 may be configured to apply the writes involved in the write transaction 108 to the replica 104 in log sequence order; i.e., the write transaction may be applied only after other write transactions 108 that are associated with an earlier log sequence number, and before other write transactions 108 that are associated with a later log sequence number. In this manner, the replicas 104 may enforce the order of writes applied to the data set, which may avoid problems such as write-after-write hazards. Additionally, in some scenarios, the leader 202 may be configured to generate and assign the log sequence numbers to each write transaction applied to the data set 106, e.g., in order to provide a consistent sequence of write operations applied to the data set 106 by the replicas 104. Many such variations may be included in the processing of the distributed transaction 108 over the replica set 102 in accordance with the techniques presented herein.

E4. Nested Consensus Over Geographically Distributed Server Sets and Transactions A fourth aspect that may vary among embodiments of the techniques presented herein involves the processing of geographically distributed transactions 108 using server sets that are geographically distributed, and that include more than one replica set 102.

As a first variation of this fourth aspect, the replica set 102 may be a member of a server set that spans a plurality of regions, such as a broadly distributed server set or even a globally distributed server set that provides transactions 108 on behalf of a broad, and even global, client base. In such scenarios, it may be desirable to limit the replicas 104 of the replica set 102 to a single region. That is, the replica sets 102 may be identified as groups of servers 120 that are within a reasonable distance, such that communication latency is maintained within a reasonable level.

As a second variation of this fourth aspect, a server set may spans a plurality of fault domains, wherein each server 120 is located in a particular fault domain that, if subjected to a failure event (e.g., fire, flood, theft, or loss of power or network connectivity), is also likely to cause the failure of other servers 120 within the same fault domain. Examples include a rack of a server room; a building of a campus; or a city of a region. It may be desirable to provide replica sets 102 as sets of replicas 102 are located within different fault domains (e.g., in different server racks, buildings, and/or cities) to reduce the incidence of a coincident fault that removes a plurality of replicas 104 from a replica set 102.

As a third variation of this fourth aspect, a transaction 108 may be concurrently and/or consecutively processed against a set of two or more replica sets 102. For example, a write transaction request 206 may arrive at a first replica set 102, and a successful commit of the write transaction 108 by the first replica set 102 may result in the propagation of the write transaction request 206 to other replica sets 102 for further processing. In such scenarios, a selected follower 204 of the first replica set 102 may be further designated as a forwarder of the distributed transaction 108 that forwards the result of the transaction request 206 to at least one other replica set 102 of the server set. It may also be feasible to designate the leader 202 as a forwarder. Such designation may be advantageous, e.g., for expediting the forwarding of the result of the transaction request 206 to other replica sets 102; however, refraining from designating the leader 202 as a forwarder may be advantageous for conserving the resources of the leader 202 for the management of transactions within the replica set 102. Alternatively or additionally, a replica 104 of the replica set 102 may receive a transaction request 206 not directly from a source 316 of the transaction request 206, but from a forwarder of another replica set 102 where the requested transaction 108 has been successfully applied and committed.

As a fourth variation of this fourth aspect, a distributed transaction 108 may be processed through a server set using a nested quorum. That is, in addition to determining the success of a transaction 108 among the replicas 104 of each replica set 102 according to a quorum count 112 within the replica 104, a second-level quorum may be assessed over the collection of replica sets 102, such that the transaction 108 succeeds only if a quorum of replica sets 102 issue an acknowledgment 212 of the success and local commit 216 within each replica set 102. For example, a transaction 108 may not be deemed a success if the acknowledgment count 214 within a selected replica set 102 meets the quorum count 112, but according to a second-level quorum count 112 of replica sets 102 that indicates a success of the distributed transaction 108 across the server set (e.g., only if, out of a set of five replica sets 102, at least three replica sets 102 succeed in applying the transaction 108). The second-level quorum at the level of replica sets 102 may therefore establish a hierarchical coordination of the transaction on a broader, and potentially global, scale.

Within such scenarios, as a first such example, a distributed transaction 108 may further define a second-level quorum. The leaders 202 of each replica set 102 may, upon successfully applying the transaction 108 to the local set of replicas 104, further transmit an acknowledgment to at least one other replica set 102. In some scenarios, the second-level quorum count may be set equal to a replica set count of replica sets 102 involved in the transaction 108 (e.g., a write request may only be deemed a success if committed by every replica set 102 of the server set). Alternatively or additionally, the transaction 108 may be processed differently based on the transaction type of the transaction 108. For example, the leader 202 of each replica set 102 may be configured to forward the result 218 to other replica sets 102 only for distributed transactions 108 that comprise distributed write transactions, which are to be applied consistently over the entire server set. However, it may not be necessary to achieve such broad consensus (including global consensus) for read transactions 108. For read transactions, the leader 202 may refrain from forwarding the result 218 to other replica sets 102 and may instead transmit a read result 218 directly to the source 316 of the read transaction 108 (e.g., providing a value upon which the replicas 104 of the local replica set 102 have established a consensus, even if broader consensus over other replica sets 102 may vary). Such techniques may enable the extension of the quorum-based transaction processing techniques to a broader, including global, scale of server sets.

FIG. 8 is an illustration of an example scenario 800 featuring a processing of a distributed transaction 108 according to a nested quorum in accordance with the techniques presented herein. In this example scenario 800, a transaction 108 is to be applied to a data set 106 that is replicated over the replicas 104 of three replica sets 102, each of which comprises a designated leader 202 and a set of two designated followers 204. For transactions 108 comprising a write transaction 108, in addition to the respective replica sets 102 internally processing the transaction 108 over the replicas 104 of the replica set 102 using the techniques presented herein, the leaders 202 may coordinate to establish a second-level quorum over the collection of replica sets 102 according to a second-level quorum count 808 (e.g., a unanimous commitment of the transaction over all three replica sets 102). The replica set 102 that received the transaction 108 may initially process the transaction 102 according to a first-level quorum, and upon reaching a successful result 218, a selected follower that is designated as a forwarder 802 may forward an acknowledgment 212 to the other replica sets 102. The third replica set 102 may similarly process the transaction 108 locally and forward an acknowledgment 212 to the first replica set 102. The leader 202 of the first replica set 102 may be responsible both for processing the transaction 108 within the first replica set 102 and for receiving and tallying the acknowledgments 212 from the other replica sets 102, and comparing with the second-level quorum count 808. The transaction 108 may be deemed a success over the entire server set if a second-level acknowledgment count meets the unanimous second-level quorum count 808; alternatively, the leader 202 of the first replica set 102 may declare the transaction 108 a failure and initiate a rollback process over all three replica sets 102. In this manner, the server set may achieve a nested quorum processing of the transaction 108 to distribute the write across all replicas 104 of the data set 106. However, such extensive processing and nested consensus over multiple replica sets 102 may not be necessary for all such transactions 108. For example, a read transaction 108 received by a particular replica set 102 may be evaluated simply by providing to the source 316 a read transaction result 218 after achieving a consensus only within the replica set 102, or even only by a single replica 104, as may be consistent with a consistency level of the data set 104.

As demonstrated, e.g., in FIG. 8, the application of consensus over a hierarchical arrangement of replica sets may enable the propagation of the transactions to a broadly distributed set of servers. Additionally, by applying the consensus first at a local level (e.g., by the replica set that received the transaction, and/or that is closest to a source of data involved in the transaction), the transaction may be locally committed in a rapid manner. Such rapid commitment may promote compliance with low-latency guarantees, such as a guarantee of end-to-end commitment within 10 milliseconds for at least 99% of read transactions and/or an end-to-end commitment within 15 milliseconds for at least 99% of write transactions applied within the same region, where the guarantees are typically fulfilled in an even more rapid manner, such as under 5 milliseconds. The rapid commitment of queries to the local replica set using a first-level consensus, followed by propagation to other replica sets in a broadly distributed manner, may additionally promote compliance with such guarantees while also enabling broadly distributed transactions. Within such contexts, the rapid commitment of transactions in a nested consensus manner may also promote the scalability of the server and data set to scale to support a larger transactional volume, wherein a number of concurrently processed transactions may be handled due to the more rapid commitment of queries. Many such variations may be included in the distributed processing of transactions 104 over a server set of replica sets 102 in accordance with the techniques presented herein.

F. Computing Environment

Figure 9:
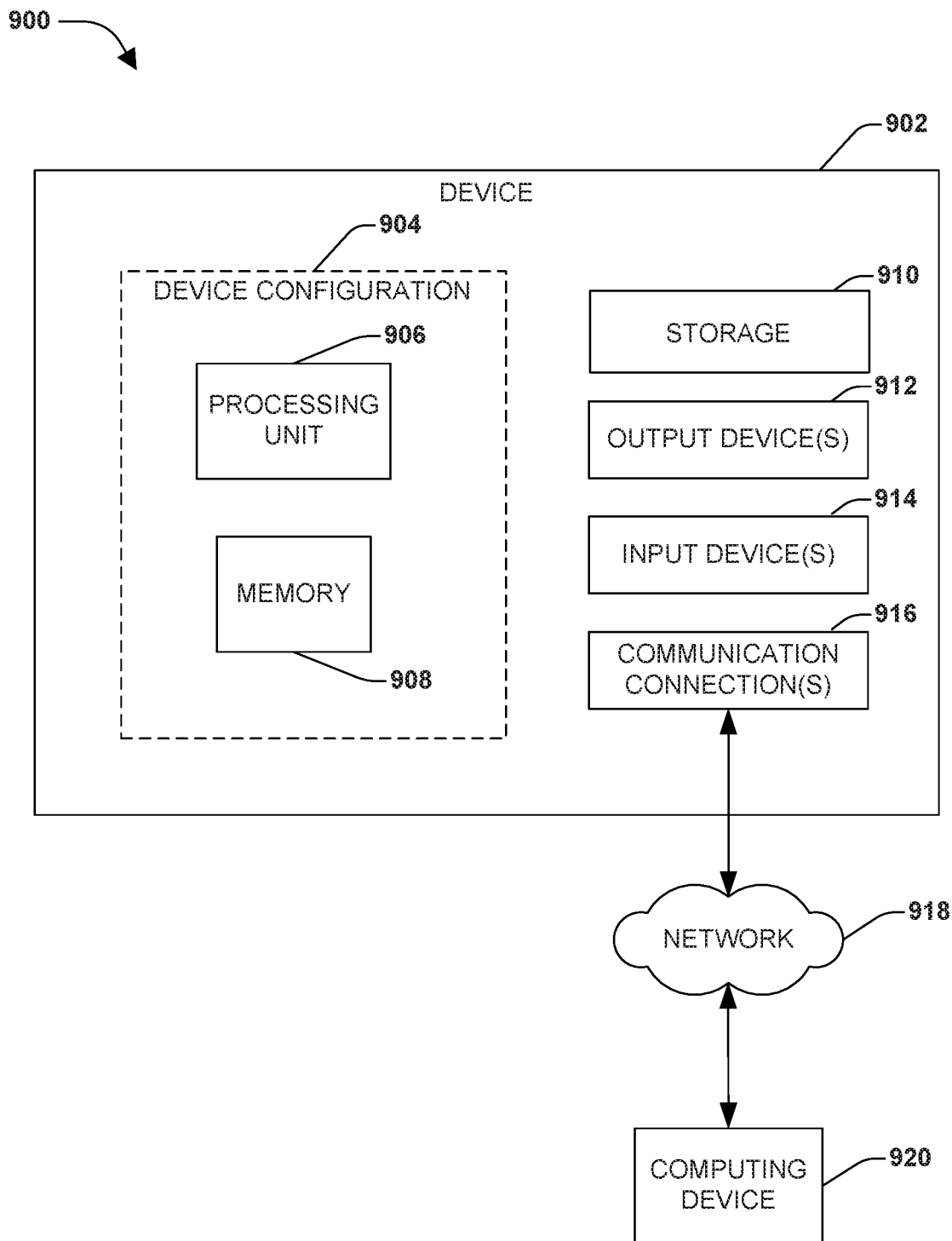
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

As used in this application, the term "each," in the context of a plurality of items, is used to describe one or more of the items in the plurality in an individual manner. The term "each" is not intended to mean "each and every." In some instances, the comments about "each" item may accurately describe all of the items in the plurality; in other instances, one or more items in the plurality may not be accurately described by such comments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A server of a replica set of servers that applies transactions as replicas over a data set, the server comprising:
 a processor; and
 a memory storing instructions that, when executed by the processor, cause the server to serve as a leader for the replica set of servers to fulfill a transaction request for a transaction by:
  determining a transaction-dependent quorum count of servers among the replica set of servers required for the transaction, wherein the transaction-dependent quorum count includes the leader for a write transaction type and excludes the leader for a read transaction type;
  transmitting the transaction request to at least two other servers of the replica set of servers serving as followers of the leader;
  receiving, from each follower, an acknowledgment of a local success of the transaction; and
  responsive to receiving an acknowledgment count of acknowledgments from the followers that contribute to the transaction-dependent quorum count:
   locally committing the transaction on the leader on condition of the transaction comprising the write transaction type that is met by the transaction-dependent quorum count that includes the leader,
   refraining from locally committing the transaction on condition of the transaction comprising the read transaction type that is not met by the transaction-dependent quorum count that excludes the leader, and
  transmitting a result of the transaction to fulfill the transaction request.

2. The server of claim 1, wherein transmitting the result of the transaction includes transmitting the result of the transaction to a source of the transaction request from a follower of the replica set of servers.

3. The server of claim 1, wherein:
 the data set is associated with a consistency level; and
 determining the transaction-dependent quorum count of servers further comprises: identifying the transaction-dependent quorum count of servers according to the consistency level of the data set.

4. The server of claim 3, wherein:
 determining the transaction-dependent quorum count of servers for the read transaction type further comprises:
  for a strict consistency level, using a majority quorum count;
  for a bounded staleness consistency level, using a minority quorum count; and
  for an eventual consistency level, using a single-replica quorum count.

5. The server of claim 1, wherein determining the transaction-dependent quorum count of servers further comprises:
 initially selecting the transaction-dependent quorum count of servers according to an initial replica count of servers of the replica set of servers; and
 on condition of a replica count change of the servers of the replica set of servers, adjusting the transaction-dependent quorum count of servers according to an updated replica count of servers of the replica set of servers.

6. The server of claim 1, wherein the instructions that, when executed by the processor, further cause the server to:
responsive to the acknowledgment count of acknowledgments from the followers that contribute to meeting the transaction-dependent quorum count that excludes the leader, locally committing the transaction on the leader.

7. The method of claim 1, further comprising:
responsive to determining that the acknowledgment count of acknowledgments from the followers contribute to meeting the transaction-dependent quorum count that excludes the leader, causing the leader to locally commit the transaction.

8. A method of configuring a replica set of servers as replicas for a data set to apply transactions over the data set, the method comprising:
designating a first server of the replica set of servers as a leader for the replica set of servers;
designating at least two other servers of the replica set of servers as followers of the leader; and
configuring the leader to fulfill a transaction request for a transaction by:
determining a transaction-dependent quorum count of the replica set of servers required for the transaction, wherein the transaction-dependent quorum count includes the leader for a write transaction type and excludes the leader for a read transaction type;
transmitting the transaction request to at least two other servers of the replica set of servers serving as the followers of the leader;
receiving, from each follower, an acknowledgment of a local success of the transaction; and
responsive to receiving an acknowledgment count of acknowledgments from the followers that that contribute to the transaction-dependent quorum count:
locally committing the transaction on the leader on condition of the transaction comprising the write transaction type that is met by the transaction-dependent quorum count that includes the leader,
refraining from locally committing the transaction on condition of the transaction comprising the read transaction type that is not met by the transaction-dependent quorum count that excludes the leader, and
transmitting a result of the transaction to fulfill the transaction request.

9. The method of claim 8, wherein:
each server of the replica set further comprise a resource allocation of computational resources; and
designating the leader further comprises: increasing a resource allocation of computational resources for the leader.

10. The method of claim 8, wherein:
the write transaction that is associated with a log sequence number; and
locally committing the transaction further comprises:
locally committing the write transaction type after write transactions that are associated with an earlier log sequence number and before write transactions that are associated with a later log sequence number.

11. The method of claim 10, wherein configuring the leader further comprises: configuring the leader to generate and assign the log sequence numbers to each write transaction type applied to the data set.

12. The method of claim 8, further comprising:
responsive to the acknowledgment count of acknowledgments from the followers that contribute to meeting the transaction-dependent quorum count that excludes the leader, locally committing the transaction on the leader.

13. A method of configuring a replica set of at least three servers to apply transactions over a data set as replicas, the method comprising:
designating among the replica set of servers:
a leader, and
at least two followers of the leader; and
determining a transaction-dependent quorum count of the replica set of servers required for a transaction, wherein the transaction-dependent quorum count includes the leader for a write transaction type and excludes the leader for a read transaction type;
distributing a transaction request for the transaction to the at least two followers;
counting acknowledgments received from each follower of the at least two followers indicating a local success of the transaction, wherein the acknowledgments received from each follower contribute to the transaction-dependent quorum count that includes the leader on the condition that the transaction is the write transaction type and excludes the leader on the condition that the transaction is the read transaction type;
determining whether the transaction-dependent quorum count is met for the transaction;
responsive to determining that the transaction-dependent quorum count is met for the transaction:
causing the leader to locally commit the transaction, and
transmitting a result of the transaction to fulfill the transaction request; and
responsive to determining that the transaction-dependent quorum count is not met for the transaction, refraining from the leader locally committing the transaction.

14. The method of claim 13, wherein:
the replica set of servers is a member of a server set that spans a plurality of regions; and
the servers of the replica set of servers are located within a common region.

15. The method of claim 13, wherein:
the replica set of servers are members of a server set that spans a plurality of fault domains; and
the servers of the replica set of servers are located within different fault domains.

16. The method of claim 13, wherein:
the transaction further comprises a distributed transaction that spans the replica set of servers and at least one other replica set of servers of a server set; and
designating the at least two followers further comprises:
further designating a selected follower as a forwarder of the distributed transaction; and
transmitting the result further comprises: configuring a server of the replica set of servers to forward the result of the transaction request to the at least one server of the other replica set of servers of the server set.

17. The method of claim 16, wherein:
the distributed transaction further defines a second-level quorum of different replica sets completing the distributed transaction, wherein the distributed transaction is determined to be complete based on the second-level quorum being met; and
forwarding the result of the transaction request to the at least one server of the other replica set of servers further comprises: transmitting, to the at least one server of the other replica set of servers, an acknowledgment of the transaction committed by the leader.

18. The method of claim 17, wherein the second-level quorum further comprises a second-level quorum count of replica sets of servers that indicates a success of the distributed transaction across the server set.

19. The method of claim 18, wherein:
- the server set comprises a replica set count of replica sets of servers involved in the transaction; and
- the second-level quorum count is equal to the replica set count.

20. The method of claim 16, wherein:
- on condition of the write transaction type of the transaction further comprising a distributed write transaction type, forwarding the result of the distributed write transaction type to the at least one other replica set servers of the server set; and
- on condition of the read transaction type of the transaction further comprising a read transaction type, transmitting a read result to a source of the read transaction type.

\* \* \* \* \*